United States Patent
Ingles, Jr.

(10) Patent No.: US 6,456,370 B1
(45) Date of Patent: Sep. 24, 2002

(54) METHOD OF MEASURING BENDING LOSS WITH AN OPTICAL TIME DOMAIN REFLECTOMETER

(75) Inventor: Andrew L. Ingles, Jr., Alpharetta, GA (US)

(73) Assignee: Fitel USA Corp., Norcross, GA (US)

(*) Notice: Subject to any disclaimer, the term of this patent is extended or adjusted under 35 U.S.C. 154(b) by 0 days.

(21) Appl. No.: 09/820,405

(22) Filed: Mar. 29, 2001

(51) Int. Cl.$^7$ .............................................. G01N 21/00
(52) U.S. Cl. ................................................... 356/73.1
(58) Field of Search ........................... 356/73.1, 239.1, 356/124.5; 385/11, 28, 32; 359/161, 110, 115, 125; 65/378, 435, DIG. 13

(56) References Cited

U.S. PATENT DOCUMENTS 4,636,070 A * 1/1987 Ide ............................ 356/73.1
5,278,932 A * 1/1994 DeVeau, Jr. et al. ........ 385/134

* cited by examiner

*Primary Examiner*—Frank G. Font
*Assistant Examiner*—Tu T Nguyen
(74) *Attorney, Agent, or Firm*—Thomas, Kayden, Horstemeyer & Risley, LLP

(57) ABSTRACT

This disclosure provides a method, system, and computer system for measuring bending loss of an optical fiber with an optical time domain reflectometer (OTDR). Generally, the method of the present invention provides OTDR device that measures a one-way OTDR splice loss at a point in the optical fiber. Subsequently, a bend is introduced into the optical fiber and a second one-way OTDR splice loss measurement is performed at the same point in the optical fiber as the first measurement. Thereafter, the bending loss of the optical fiber is determined and related to an approximate cut-off wavelength of the optical fiber.

14 Claims, 5 Drawing Sheets

METHOD OF MEASURING BENDING LOSS WITH AN OPTICAL TIME DOMAIN REFLECTOMETER

TECHNICAL FIELD

The present invention is generally related to measuring optical fiber characteristics and, more particularly, is related to a method for measuring bending loss of optical fibers.

BACKGROUND OF THE INVENTION

Presently, optical fiber is characterized using many stages. These characterization stages include a stage of measuring various characteristics such as the amount of curvature frozen into the glass, fiber length, loss uniformity, mode field diameter, mode field uniformity, point defects, chromatic dispersion uniformity, geometry, bending loss, cut-off wavelength, etc. Often the characterization stages are located at different locations, which requires transporting the optical fiber to the next characterization location and incurring the concomitant expenses. Further, valuable production space is needed to conduct these characterization stages. Furthermore, characterization stages located distant from one another necessarily requires additional personal and equipment to perform the characterization tests. In this regard, a direct correlation can be drawn between the number of characterization stages and the cost expenditures associated with the characterization of a unit of optical fiber.

Thus, a heretofore unaddressed need exists in the industry to decrease the costs associated with the characterization of optical fiber.

SUMMARY OF THE INVENTION

An embodiment of the present invention provides a method, system, and computer system for measuring bending loss of an optical fiber with an optical time domain reflectometer (OTDR). Generally, one embodiment of the method of the present invention provides OTDR device that measures a one-way OTDR splice loss at a point in the optical fiber. Subsequently, a bend is introduced into the optical fiber and a second one-way OTDR splice loss measurement is performed at the same point in the optical fiber as the first measurement. Thereafter, the bending loss of the optical fiber is determined and related to an approximate cut-off wavelength of the optical fiber.

Another embodiment of the present invention provides a system for measuring bending loss of an optical fiber with an OTDR and a optical fiber bending apparatus.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Embodiments of the present invention provide a method, a system, and a computer system for obtaining optical time domain reflectometer (OTDR)-based cut-off wavelength measurements. Embodiments of the present invention are capable of measuring the bending losses of an optical fiber and relating the bending loss to the cut-off wavelength during the OTDR testing stage or step. Combining the measurement of the bending loss of a particular optical fiber and relating the bending loss to an approximate cut-off wavelength provides a method to bypass one or more costly steps in the characterization, testing and validation process of an optical fiber. The bending loss measurement can be performed using an OTDR. Once the bending loss for a particular fiber is determined, the bending loss can be related mathematically to a cut-off wavelength approximation that corresponds to the optical fiber using well known mathematical approximation techniques.

Figure 1A:
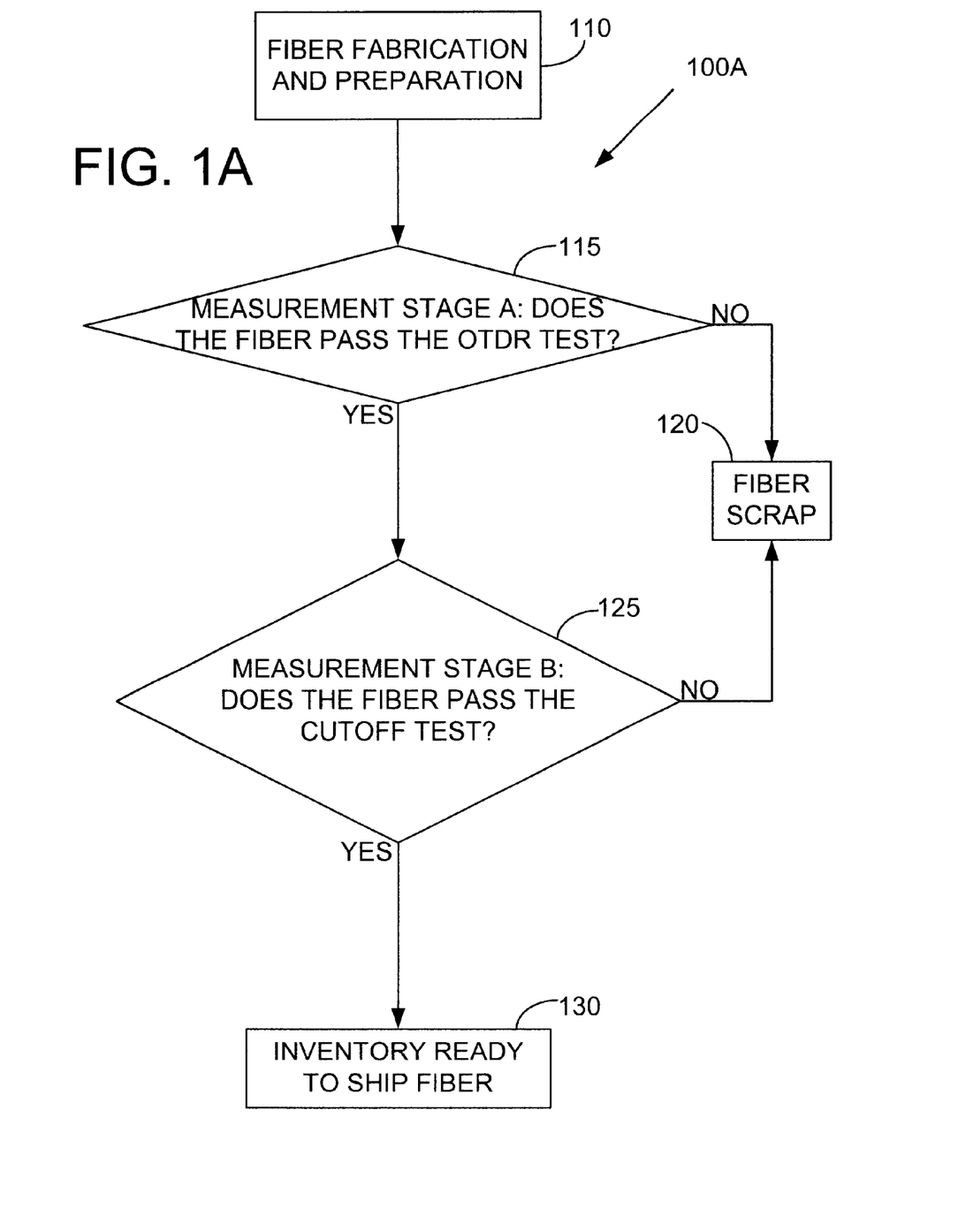
FIGS. 1A and 1B illustrate how an embodiment of the present invention can be incorporated into the process of testing and validating an optical fiber.
Figure 1B:
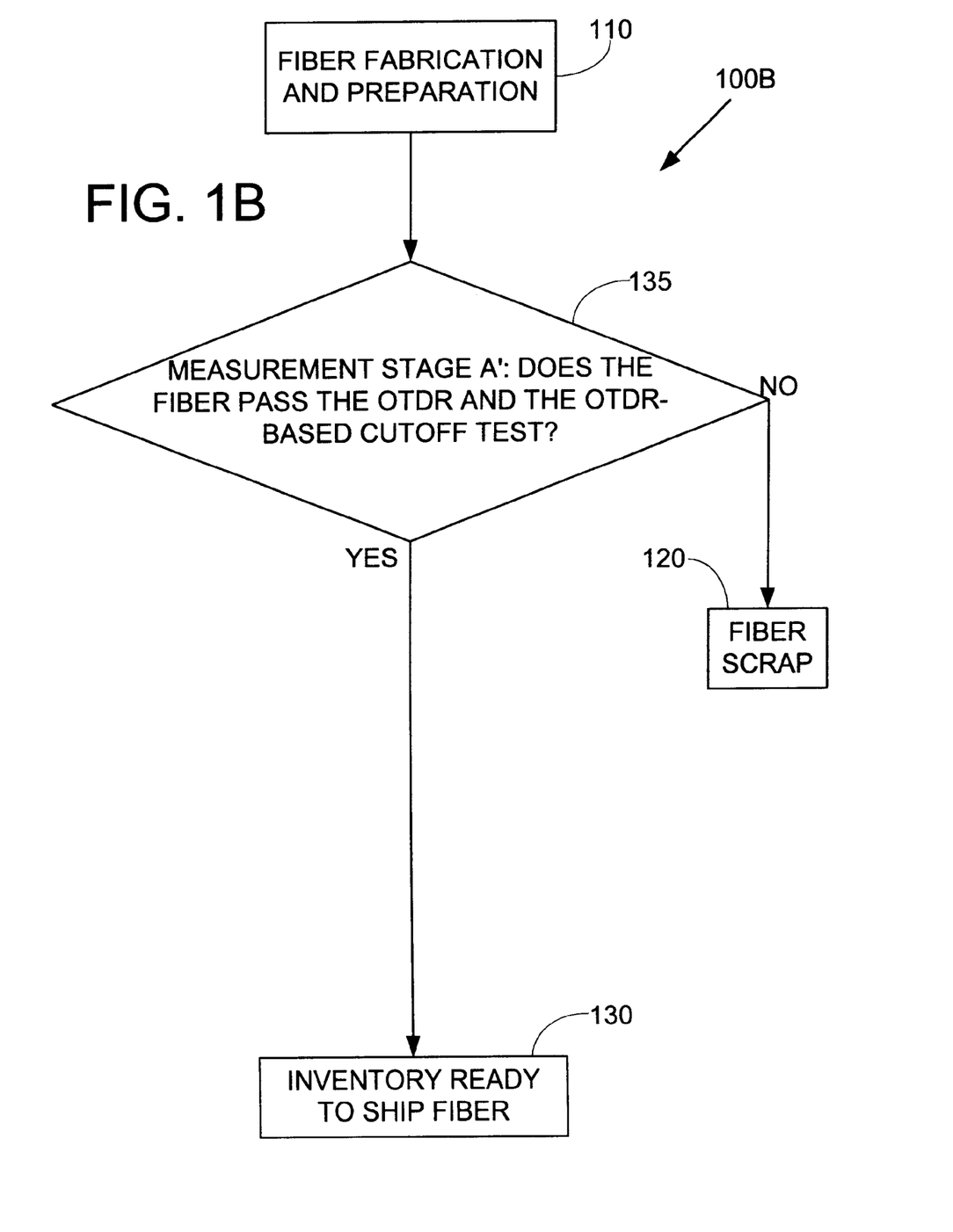

FIGS. 1A and 1B illustrate flow charts of a portion of the testing and validation process 100A that a quantity of optical fibers is subject to in order to be used by a customer. Initially, as shown in block 110, the fiber is fabricated and prepared and is then subject to a plurality of test stages. Block 115 illustrates measurement stage A, which is represented as a decisional block that determines if the optical fiber passes the OTDR test, which measures the one-way splice loss of the optical fiber. If the determination is "no", then the optical fiber is scrapped or recycled as shown by block 120. If the determination is "yes", then the optical fiber is subject to further testing at measurement stage B. Block 125 illustrates measurement stage B, which is represented as a decisional block that determines if the optical fiber passes the cut-off wavelength test. In general, the cut-off wavelength test involves connecting both ends of a two meter length of fiber to a transmission loss test system (e.g. white light source, monochromator, detector, launch and receive optics). The optical fiber is arranged in a controlled layout with two 80 mm diameter loops in the optical fiber with the rest of the fiber being either straight or having 28 cm or greater radius. The transmitted power is measured at many wavelengths that include the expected cutoff wavelength. The power at each wavelength is compared to the power through a 62.5 micron-multimode optical fiber stored reference. The resulting data set has a transition region. The wavelength at a particular point in this transition is defined as the cut-off wavelength of the optical fiber. If the determination is "no", then the optical fiber is scrapped or recycled as depicted in block 120. If the determination is "yes", then the optical fiber may be put into inventory, as illustrated in block 130 where it will later be shipped to a customer.

It should be noted that there may be one or more steps or stages in-between blocks 110, 115, 120, 125, and 130. FIG. 1A only illustrates two measurement stages and other measurement stages have been omitted for reasons of clarity. The other measurements that are capable of being performed in the same or other stages include, but are not limited to, curl measurements, dispersion measurements, geometry measurements, and mode field diameter measurements. In addition, other stages related to rewinding and repairing optical fiber can be included in the testing and validation process 100A.

As can be understood from the description above, there are two separate measurement stages, namely A and B, for measurements relating to one-way splice loss, which is performed using an OTDR, and the cut-off wavelength, as discussed above. Having two separate measurement stages increases costs related to transportation of the optical fiber from measurement stage A to measurement stage B, increases analysis time costs, and increases labor costs for performing two separate measurements.

FIG. 1B illustrates flow charts of a process 100B that can eliminate the separate step of measuring the cut-off wavelength by incorporating an embodiment of the OTDR-based cut-off wave length method and system. Incorporating embodiments of the present invention does not measurably increase the cost related to testing time, but decreases costs related to transportation and labor. Initially, as shown in block 110, the optical fiber is fabricated and prepared and is then subject to a plurality of test stages. Block 135 illustrates measurement stage A', which is represented as a decisional block that determines if the optical fiber passes the one-way OTDR splice loss test and if the fiber passes the OTDR-based cut-off wavelength test. This is in contrast to block 115 illustrated in FIG. 1A, which only determines if the one-way OTDR splice loss test is passed. Embodiments of the present invention enable the determination of an approximate cut-off wavelength using an OTDR apparatus, which is discussed in more detail below. Measurement stage A' measures fiber length, loss, loss uniformity, mode field diameter, mode field uniformity, point defects, chromatic dispersion uniformity and other parameters using an OTDR apparatus. Similar to FIG. 1A, if the determination in block 135 is "no", then the optical fiber did not pass the tests and the optical wire is scrapped or recycled as shown in block 120. If the determination is "yes", then the optical fiber passed the tests and is put into inventory, as depicted in block 130.

It should be noted that there may be one or more steps or stages in-between blocks 110, 120, 130, and 135. FIG. 1B only illustrates two measurement stages and other measurement stages have been omitted for reasons of clarity. The other measurements that are capable of being performed in other stages include, but are not limited to, curl measurements, dispersion measurements, geometry measurements, and mode field diameter measurements. In addition, other stages related to rewinding and repairing optical fiber can be included in the testing and validation process 100B.

Generally, the OTDR is used primarily for the detection and location of faults in an optical fiber. The OTDR can also provide information about fiber attenuation, uniformity and the insertion loss of splices and connectors. Generally, an OTDR is a one-dimensional, closed-circuit, optical radar. It operates by periodically launching short-duration laser pulses into one end of the optical fiber under test and monitoring the amplitude and temporal characteristics of the reflected light.

In general, the OTDR operates by launching a short duration pulse of optical radiation (approximately 20–2000 nanoseconds) into a test fiber via a directional coupler. The all-fiber coupler is the most common, although bulk optics (lenses and beam splitters) may also be used. The output of the directional coupler (R/T port) can serve to both receive the backscattered radiation and to transmit the probe pulse in the forward direction. The R/T port may, for example, include a connecterized termination or a micropositioner and jig which accepts a bare fiber. Backreflected radiation from the test fiber is detected, processed, and finally displayed on an oscilloscope screen or recorder of some sort. The output signal responds as a function of distance along the fiber and is often referred to as a signature because it is a characteristic that can be identified with a particular fiber or fiber system.

Figure 2:
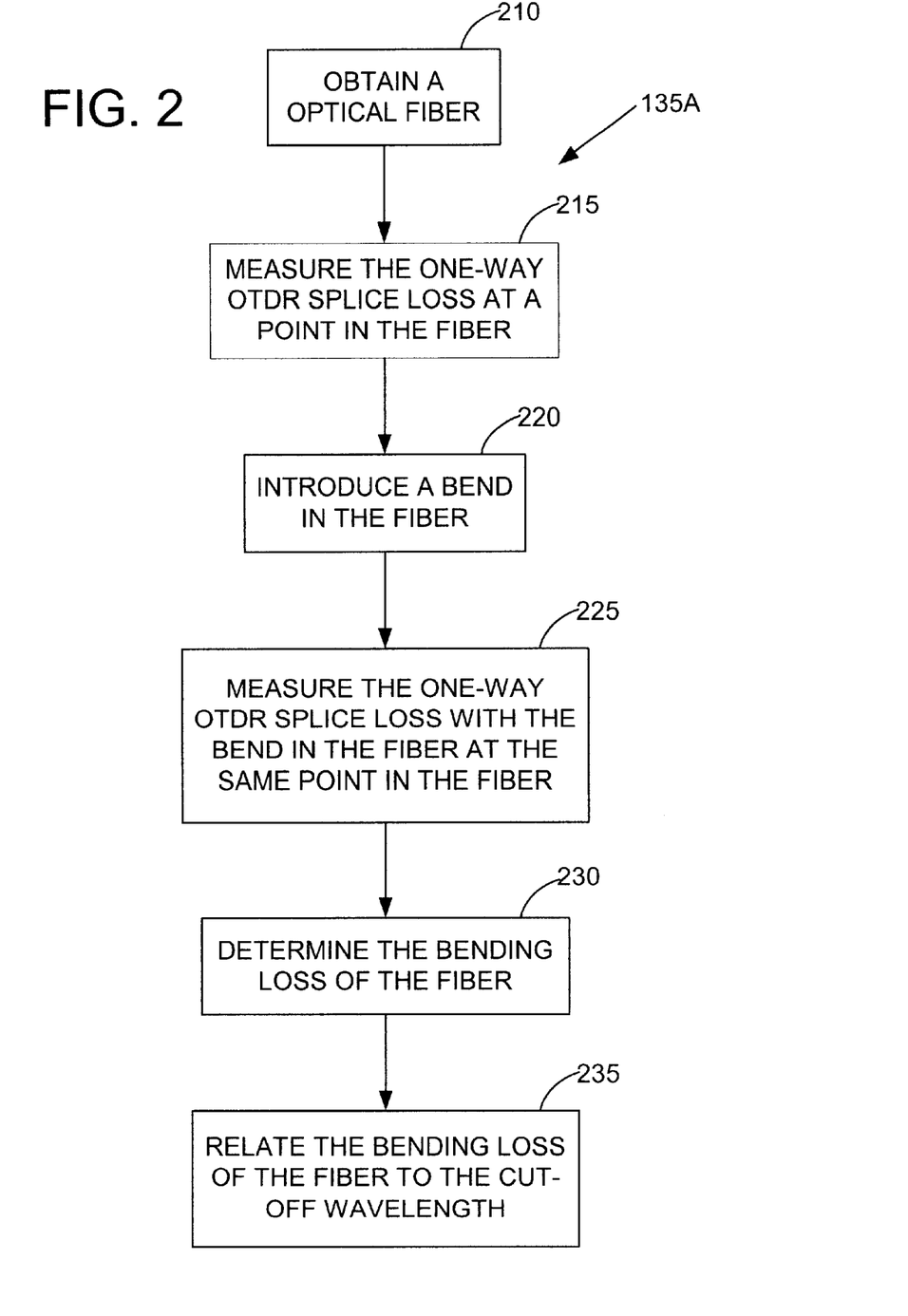
FIG. 2 illustrates an embodiment of the present invention that is capable of being implemented into the process shown in FIGS. 1A and 1B.

While other embodiments are possible, FIG. 2 illustrates a flow chart 135A of one exemplary embodiment of the OTDR-based cut-off wavelength method and system for determining an approximation of the cut-off wavelength of an optical fiber. In block 135 of FIG. 1B, measurement stage A' measures fiber length, loss, loss uniformity, mode field diameter, mode field uniformity, point defects, chromatic dispersion uniformity and other parameters using an OTDR apparatus. In addition, an embodiment of the present invention uses an OTDR-based cut-off wavelength method and system that can be used to relate bending loss to the approximate cut-off wavelength of a particular optical fiber. More specifically in FIG. 2, block 210 of the flow chart represents the acquisition of an optical fiber spool or other quantity of optical fiber. In block 215, the bending loss is determined by measuring the one-way OTDR splice loss at a point in the optical fiber. Generally, the splice loss test is performed to characterize an optical fiber. Subsequently, a bend is introduced into the optical fiber, as shown in block 220. Thereafter, as depicted in block 225, a second bend loss measurement is performed on the optical fiber with one or more bends by measuring the second one-way OTDR splice loss of the optical fiber at the same point as the first bend loss measurement. The bending loss of the optical fiber is determined from the difference between the splice losses with and without the bends, and can then be mathematically related to the cut-off wavelength of the optical fiber, as shown in blocks 230 and 235, respectively. Typically, the bend is introduced substantially close to the end of the fiber, which is close to the optical connection between the OTDR's jumped fiber and the optical fiber under test. Introduction of the bend does not alter or affect the initial OTDR splice loss measurement.

Generally, the OTDR apparatus tests from one direction at a time. The measurement obtained is a function of the optical fiber splice loss and other parameters such as mode field variations. Therefore, a one-way OTDR splice loss measurement is not a true splice loss measurement, which is determined by measuring the one-way OTDR splice loss from both ends of the optical fiber. However, as discussed in more detail below, a correlation exits between one-way OTDR splice loss measurements and cut-off wavelength measurements.

Figure 3A:
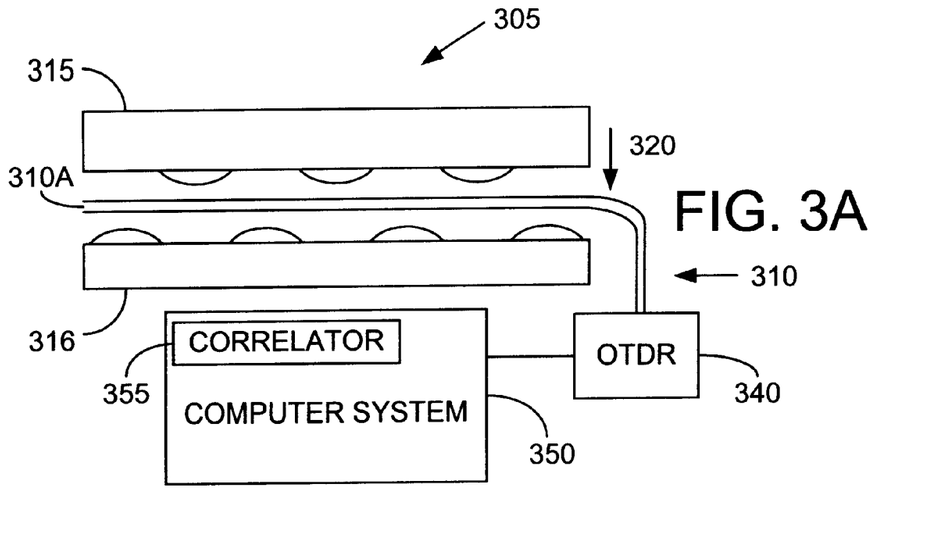
FIGS. 3A and 3B illustrate an embodiment of the bending mechanism that can be used in an embodiment of the present invention.
Figure 3B:
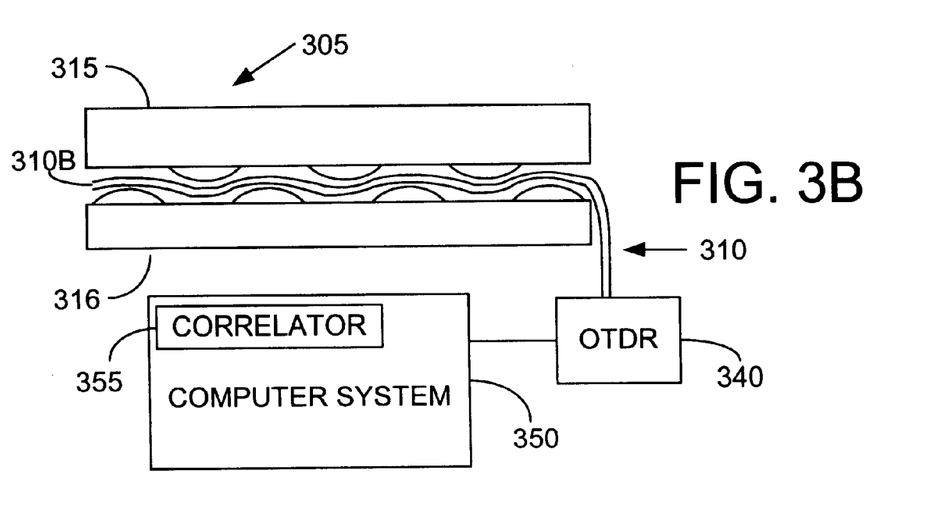

FIG. 3A and 3B illustrate one of many embodiments of an optical fiber bending apparatus 315 and 316 as incorporated in the OTDR-based cut-off wavelength apparatus 305. The OTDR-based cut-off wavelength apparatus 305 includes the optical fiber bend apparatus 315, OTDR 340, and a computer system 350, which includes a correlator 355 for relating bending loss to the approximate cut-off wavelength of the optical fiber 310A and 310B. The optical fiber bending apparatus 315 is capable of being used to perform OTDR-based cut-off wavelength measurements. This exemplary embodiment includes at least two press sections 315 and 316. An optical fiber 310A can be placed between the two press sections 315 and 316, as shown in FIG. 3A. One or both of the press sections 315 and 316 are capable of being moved in direction 320 into a position that temporarily imposes curves (i.e. bends) into the optical fiber 310B, as shown in FIG. 3B. Another non-limiting example of a bending apparatus includes, but is not limited to, an apparatus that imposes a loop into the optical fiber. Other bending apparatus can be used so long as the apparatus imposes one or more bends into an optical fiber sufficient to produce a measurable bending loss.

Thus, the bending loss is determined by measuring the one-way OTDR splice loss at a point in the optical fiber 310 before the press sections 315 and 316 have been moved into a position to impose a bend upon the optical fiber. Subsequently, one or more of the press sections 315 and 316 are moved in direction 320 into a position to impose a bend into optical fiber 310B. Thereafter, a second bend loss measurement is performed on the optical fiber with one or more bends being imposed upon the optical fiber 310B by measuring the one-way OTDR splice loss of the fiber at the same point as the first bending loss measurement. The bending loss of the optical fiber can then be determined from the difference between the one-way OTDR splice losses with and without the bends and can thereafter be mathematically related to the approximate cut-off wavelength of the optical fiber.

Alternatively, the one or more press sections 315 and 316 can be moved as indicated by arrow 320 into a position to impose a bend into the optical fiber 310B. Thereafter, a one-way OTDR splice loss measurement can be performed upon the optical fiber 310B that has a bend imposed upon it. Subsequently, the press sections 315 and 316 can be removed and a one-way OTDR splice loss measurement can be performed. In other words, the order of the one-way splice loss OTDR measurements is not crucial. After the measurements are performed the bending loss of the optical fiber can be determined and related to the approximate cut-off wavelength of the optical fiber by correlating the bend loss of the optical fiber to the approximate cut-off wavelength of the optical fiber by means of a pre-established correlation relationship.

The bending loss of a particular optical fiber can be mathematically related to the approximate cut-off wavelength of the same optical fiber using a correlator 355. The correlator 355 is capable of mathematically relating the bending loss and cut-off wavelength of a particular optical fiber using traditional well-known mathematical principals. One embodiment of the correlator 355 includes obtaining measurements of the bending loss and actual cut-off wavelength of a plurality of optical fibers. The curve that the correlator 355 can use to determine unknown cut-off wavelength is established after a sufficient number of determinations have been performed that span the entire bending loss and cut-off wavelength ranges. In other words, if the bending loss of a particular optical fiber is determined, the correlator 355 can be used to determine an approximate cut-off wavelength. Therefore, since the bending loss is capable of being determined during measurement stage A, an approximation can be determined for the corresponding cut-off wavelength, thereby eliminating the need for a separate and costly cut-off wavelength test. However, if the approximation is sufficiently close to failing, then that particular optical fiber can be tested further. The cumulative result of using the embodiments of the present invention (e.g. eliminate the separate cut-off wavelength test for many units of optical fiber) significantly reduces costs because many of the optical fiber spool would have approximation cut-off wavelengths that are sufficiently within the passing range.

Figure 4:
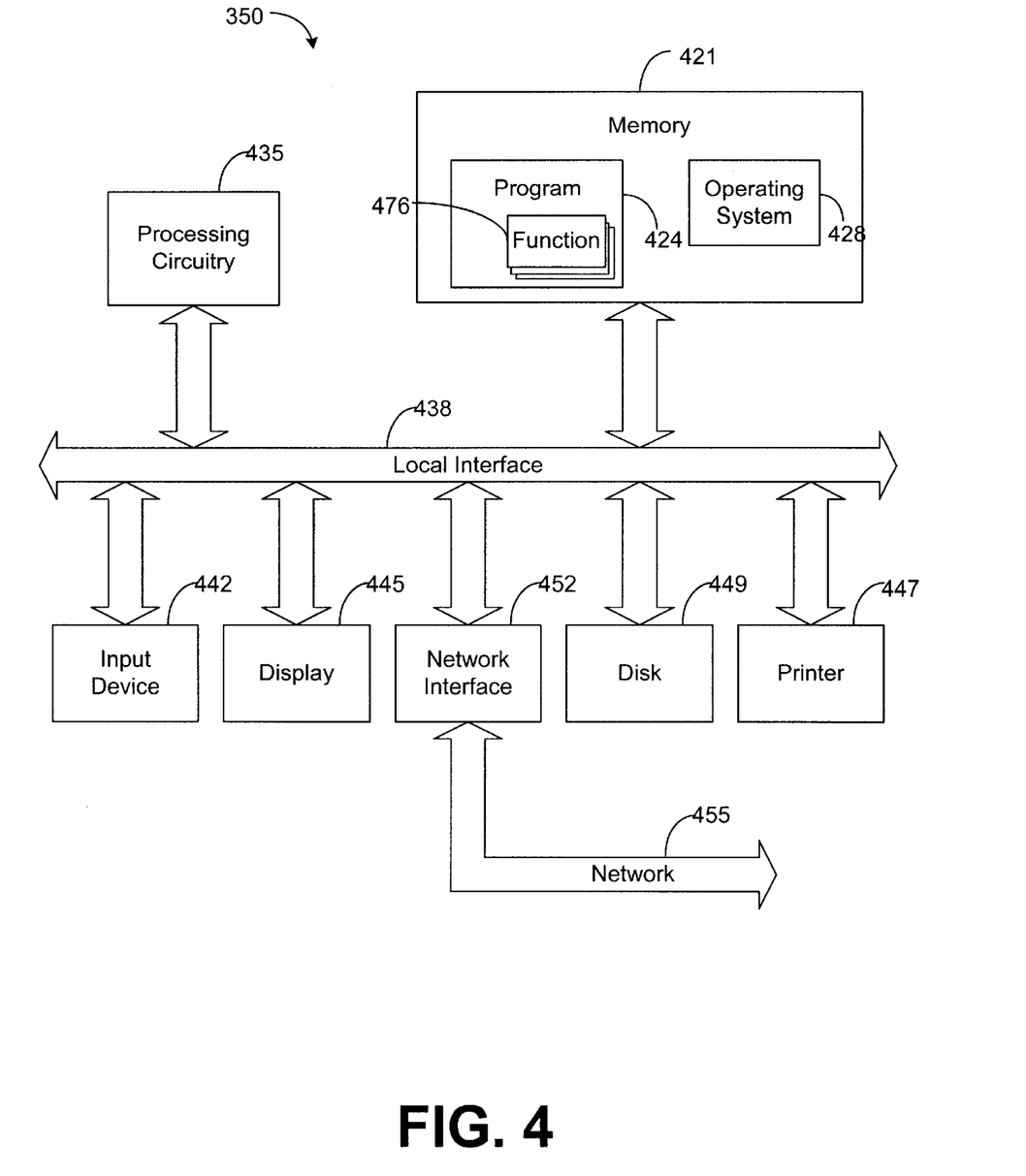
FIG. 4 illustrates a computer system that can be implemented into embodiments of the present invention.

The embodiments of the computer system for measuring bending loss with an OTDR includes controlling and operating the OTDR-based cut-off wavelength apparatus and related measurements. Initially, an optical fiber may be placed such that it is capable of being tested with the OTDR apparatus. The computer system controls the measurement of a one-way OTDR splice loss at any point in the fiber. The computer system can be capable of measuring and storing the appropriate data such as, but not limited to, one-way OTDR splice loss data. The computer system may be capable of controlling the introduction of one or more bends into the optical fiber. This may be accomplished by controlling the bending apparatus, as described above in FIG. 3A and 3B. After a bend has been introduced into the optical fiber the computer system controls a second one-way OTDR splice loss measurement at the same point in the fiber as the initial measurement splice loss measurement. Thereafter, the computer system is capable of determining the bending loss of the optical fiber being tested. Then, the computer system is capable of relating the bending loss of the optical fiber to an approximate cut-off wavelength value using a correlator 355. The approximation determination is based on the approximation determination described above and can be performed with a correlator 355. FIG. 4 illustrates the computer system that can be implemented in embodiments of the present invention.

Embodiments of the OTDR-based cut-off wavelength measurement method, system, and computer system of the present invention may include a computer system 350, as shown in FIG. 4. The computer system 350 includes memory 421 for storing and retrieving data. Similar to conventional memory systems, the memory 421 depicted by FIG. 4 includes various locations for storing data, and each of these locations is identified by an address, as included within the scope of various embodiments of the present invention. In the exemplary embodiment depicted by FIG. 4, a program 424 and an operating system 428 are stored in the computer memory 421. The computer system 350 of FIG. 4 also includes processing circuitry 435, such as a general purpose microprocessor, for example that communicates to and drives the other elements within the system 350 via a local interface 438, which can include one or more buses. Furthermore, an input device 442, for example but not limited to, a keyboard, mouse, bar code scanner, etc., can be used to input data from a user of the system 350, and a screen display 445 or a printer 447 can be used to output data to the user. A disk storage mechanism 449 can be connected to the local interface 438 to transfer data to and from a nonvolatile disk (e.g., magnetic, optical, etc.). The system 350 can be connected to a network interface 452 that allows the system 350 to exchange data with a network 455.

The program 424 includes instructions or computer code written by a programmer for performing various functions 476 associated with measuring bending loss with an OTDR apparatus and relating bending loss to the cut-off wavelength of an optical fiber (e.g. a correlator 355). Programmers often choose to write programs, such as the program 424, in a high level computer language such as C or Fortran, for example. The program 424 is in a form compatible with processing circuitry 435 and, therefore, can be executed by processing circuitry 435. The operating system 428, similar to conventional operating systems, is designed to control the operation of the computer system 350. An important service performed by the operating system 428 is the interfacing of executable instructions with the processing circuitry 435. In this regard, the operating system 428 controls which instructions stored in memory 421 are transmitted to the processing circuitry 435 for execution and controls when these instructions are transmitted to the processing circuitry 435. The program 424 and the operating system 428 can be implemented in software, hardware, or a combination thereof. In the preferred embodiment, as illustrated by way of example in FIG. 4, the program 424 and the operating system 428 along with their associated methodology are implemented in software and stored in memory 421. The program 424 can be a source program that is compiled to form an executable program.

Note that the program 424 and the operating system 428, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for approximating a cut-off wave length of an optical fiber with an optical time domain reflectometer (OTDR) comprising the steps of:
   providing an OTDR;
   measuring a one-way OTDR splice loss at a point in the optical fiber using the OTDR;
   introducing a bend in the optical fiber;
   measuring a second one-way OTDR splice loss at the point in the optical fiber using the OTDR;
   determining a bending loss of the optical fiber; and
   relating the bending loss to an approximate cut-off wavelength of the optical fiber by correlating the bend loss of the optical fiber to the approximate cut-off wavelength of the optical fiber by means of a pre-established correlation relationship.

2. The method of claim 1, wherein the step of relating the bending loss to the approximate cut-off wavelength of the optical fiber by correlating the bend loss of the optical fiber to the approximate cut-off wavelength of the optical fiber by means of a pre-established correlation relationship includes, a step of establishing a correlation relationship between bending loss and cut-off wavelength of a plurality of like kind optical fibers.

3. The method of claim 1, wherein the step of determining the bending loss of the optical fiber includes, the step of determining the bending loss of the optical fiber by determining the difference between the one-way OTDR splice loss and the second one-way OTDR splice loss.

4. A system of approximating a cut-off wavelength of an optical fiber, comprising:
   a fiber bending apparatus that is adapted to introduce at least one bend into the optical fiber;
   an optical time domain reflectometer (OTDR) that is adapted for measuring a one-way OTDR splice loss for the optical fiber before and after the bend is introduced into the optical fiber, where bending loss of the optical fiber can be determined from the one-way OTDR splice loss measurements before and after the bend is introduced into the optical fiber; and
   a correlator for relating bending loss to an approximate cut-off wavelength of the optical fiber.

5. The system of claim 4, wherein the fiber bending apparatus includes a first end and a second end that are capable of introducing a plurality of bends into the optical fiber.

6. A method for use in a computer system for approximating a cut-off wavelength of an optical fiber with an optical reflectometer (OTDR) comprising the steps of:
   controlling a first measurement of an OTDR splice loss at a point in the optical fiber;
   controlling the introduction of a bend into the optical fiber;
   controlling a second measurement of an OTDR splice loss at the point in the optical fiber after the bend has been introduced;
   determining a bending loss of the optical fiber; and
   relating the bending loss to an approximate cut-off wavelength of the optical fiber by correlating the bend loss of the optical fiber to the approximate cut-off wavelength of the optical fiber by means of a pre-established correlation relationship.

7. The method of claim 6, wherein the step of relating the bending loss to the approximate cut-off wavelength of the optical fiber by correlating the bend loss of the optical fiber to the approximate cut-off wavelength of the optical fiber by means of a pre-established correlation relationship includes, a step of establishing a correlation relationship between bending loss and cut-off wavelength of a plurality of like kind optical fibers.

8. The method of claim 6, wherein the step of determining the bending loss of the optical fiber includes, the step of determining the bending loss of the optical fiber by determining the difference between the one-way OTDR splice loss and the second one-way OTDR splice loss.

9. A system for use in a computer system for approximating a cut-off wavelength of an optical fiber with an optical reflectometer (OTDR), comprising:
   a means for controlling a first measurement of an OTDR splice loss at a point in the optical fiber;
   a means for controlling the introduction of a bend into the optical fiber;

a means for controlling a second measurement of an OTDR splice loss at the point in the optical fiber after the bend has been introduced;

a means for determining a bending loss of the optical fiber; and a means for relating the bending loss to an approximate cut-off wavelength of the optical fiber by correlating the bend loss of the optical fiber to the approximate cut-off wavelength of the optical fiber by means of a pre-established correlation relationship.

10. The system of claim 9, wherein the step of relating the bending loss to the approximate cut-off wavelength of the optical fiber by correlating the bend loss of the optical fiber to the approximate cut-off wavelength of the optical fiber by means of a pre-established correlation relationship includes, a step of establishing a correlation relationship between bending loss and cut-off wavelength of a plurality of like kind optical fibers.

11. The system of claim 9, wherein the step of determining the bending loss of the optical fiber includes, the step of determining the bending loss of the optical fiber by determining the difference between the one-way OTDR splice loss and the second one-way OTDR splice loss.

12. A computer readable medium for approximating a cut-off wavelength of an optical fiber with an optical reflectometer (OTDR), comprising:

logic configured to control a first measurement of an OTDR splice loss at a point in the optical fiber;

logic configured to control the introduction of a bend into the fiber;

logic configured to control a second measurement of an OTDT splice loss at the point in the optical fiber after the bend has been introduced;

logic configured to determine a bending loss of the optical fiber; and logic configured to relate the bending loss to an approximate cut-off wavelength of the optical fiber by correlating the bend loss of the optical fiber to the approximate cut-off wavelength of the optical fiber by means of a pre-established correlation relationship.

13. The computer readable medium of claim 12, wherein the step of relating the bending loss to the approximate cut-off wavelength of the optical fiber by correlating the bend loss of the optical fiber to the approximate cut-off wavelength of the optical fiber by means of a pre-established correlation relationship includes, a step of establishing a correlation relationship between bending loss and cut-off wavelength of a plurality of like kind optical fibers.

14. The computer readable medium of claim 12, wherein the step of determining the bending loss of the optical fiber includes, the step of determining the bending loss of the optical fiber by determining the difference between the one-way OTDR splice loss and the second one-way OTDR splice loss.

* * * * *